United States Patent
Rourk

(10) Patent No.: US 7,768,444 B1
(45) Date of Patent: Aug. 3, 2010

(54) WEAPON DETECTION AND ELIMINATION SYSTEM

(76) Inventor: Christopher J. Rourk, P.O. Box 801452, Dallas, TX (US) 75380

( * ) Notice: Subject to any disclaimer, the term of this patent is extended or adjusted under 35 U.S.C. 154(b) by 213 days.

(21) Appl. No.: 11/953,942

(22) Filed: Jan. 29, 2008

(51) Int. Cl.
 *G01S 13/86* (2006.01)
(52) U.S. Cl. .............................. 342/67; 342/22; 342/27; 342/13; 342/52; 342/54; 342/90; 342/96; 342/97
(58) Field of Classification Search .................. 342/22, 342/27, 13, 16, 17, 52, 54, 67, 90, 95–97
See application file for complete search history.

(56) References Cited

U.S. PATENT DOCUMENTS

| | | | |
|---|---|---|---|
| 2,435,984 A | 2/1948 | Spencer | |
| 3,247,421 A | 4/1966 | Backmark | |
| 3,599,035 A | 8/1971 | Frerichs et al. | |
| 3,707,913 A * | 1/1973 | Lee | 102/402 |
| 3,946,233 A * | 3/1976 | Erben et al. | 250/347 |
| 4,060,809 A | 11/1977 | Baghdady | |
| 4,136,467 A | 1/1979 | O'Rourke et al. | |
| 4,174,471 A | 11/1979 | Ford et al. | |
| 4,266,463 A | 5/1981 | Saltin | |
| 4,542,452 A | 9/1985 | Fukai et al. | |
| 4,622,554 A * | 11/1986 | Gellekink et al. | 342/67 |
| 5,036,466 A | 7/1991 | Fitzgerald et al. | |
| 5,052,637 A | 10/1991 | Lipps | |
| 5,198,607 A * | 3/1993 | Livingston et al. | 89/1.11 |
| 5,202,692 A | 4/1993 | Huguenin et al. | |
| 5,213,503 A | 5/1993 | Marshall et al. | |
| 5,215,463 A | 6/1993 | Marshall et al. | |
| 5,215,464 A | 6/1993 | Marshall et al. | |
| 5,215,465 A | 6/1993 | Marshall et al. | |
| 5,229,541 A | 7/1993 | Will et al. | |
| 5,249,501 A | 10/1993 | Waldman et al. | |
| 5,333,881 A | 8/1994 | Cugliari | |
| 5,608,321 A * | 3/1997 | Garroway et al. | 324/307 |
| 5,737,075 A | 4/1998 | Koch et al. | |
| 5,745,071 A * | 4/1998 | Blackmon et al. | 342/90 |
| 5,827,958 A | 10/1998 | Sigler | |
| 5,837,926 A * | 11/1998 | Franklin | 102/427 |
| 5,936,229 A | 8/1999 | Livingston | |
| 6,014,922 A * | 1/2000 | Livingston | 89/1.11 |
| 6,021,975 A * | 2/2000 | Livingston | 244/3.11 |
| 6,054,694 A * | 4/2000 | Paustian | 219/679 |
| 6,145,784 A * | 11/2000 | Livingston | 244/3.11 |
| 6,176,837 B1 | 1/2001 | Foxlin | |
| 6,194,898 B1 * | 2/2001 | Magnuson et al. | 324/300 |
| 6,215,731 B1 | 4/2001 | Smith | |
| 6,265,704 B1 | 7/2001 | Livingston | |
| 6,344,818 B1 * | 2/2002 | Markov | 342/22 |
| 6,359,582 B1 | 3/2002 | MacAleese et al. | |
| 6,409,687 B1 | 6/2002 | Foxlin | |
| 6,487,950 B2 * | 12/2002 | Samland | 89/1.13 |
| 6,569,011 B1 | 5/2003 | Lynch et al. | |

(Continued)

FOREIGN PATENT DOCUMENTS

WO WO 0150114 A2 * 7/2001

*Primary Examiner*—John B Sotomayor

(57) ABSTRACT

A system for detecting weapons is provided. The system includes a radar system transmitting electromagnetic radiation, analyzing reflected signals to detect a weapon, and generating reflected signal data. An energy field parameter system receives the reflected signal data and sets a plurality of energy field parameters. An energy field system transmits energy at a location associated with the detected weapon.

20 Claims, 5 Drawing Sheets

U.S. PATENT DOCUMENTS

| | | |
|---|---|---|
| 6,604,064 B1 | 8/2003 | Wolff et al. |
| 6,621,764 B1 | 9/2003 | Smith |
| 6,720,905 B2 | 4/2004 | Levitan et al. |
| 6,856,272 B2 | 2/2005 | Levitan et al. |
| 6,864,825 B2 * | 3/2005 | Holly .......................... 342/13 |
| 6,914,552 B1 | 7/2005 | McEwan |
| 6,917,635 B2 * | 7/2005 | Pruszenski, Jr. ............. 372/32 |
| 6,967,612 B1 | 11/2005 | Gorman et al. |
| 7,078,697 B2 | 7/2006 | Barker et al. |
| 7,106,058 B2 * | 9/2006 | Wilker et al. ............... 324/300 |
| 7,345,478 B2 * | 3/2008 | Lieblich et al. ............. 324/300 |
| 7,355,401 B2 * | 4/2008 | Laubacher et al. .......... 324/300 |
| 7,395,181 B2 | 7/2008 | Foxlin |
| 7,417,400 B2 | 8/2008 | Takeishi et al. |
| 7,492,303 B1 | 2/2009 | Levitan et al. |
| 7,504,982 B2 * | 3/2009 | Berg et al. .................... 342/13 |
| 7,509,766 B2 | 3/2009 | Vasquez |
| 7,649,328 B2 * | 1/2010 | Smirnov et al. ............. 315/505 |
| 2002/0153891 A1 * | 10/2002 | Smith et al. .................. 324/309 |
| 2004/0183712 A1 * | 9/2004 | Levitan et al. ................ 342/22 |
| 2005/0104603 A1 * | 5/2005 | Peschmann et al. ......... 324/637 |
| 2007/0205937 A1 * | 9/2007 | Thompson et al. ........... 342/22 |
| 2008/0129581 A1 * | 6/2008 | Douglass et al. ............. 342/52 |
| 2008/0211711 A1 * | 9/2008 | Mostov et al. ............. 342/179 |
| 2009/0195435 A1 * | 8/2009 | Kapilevich et al. ........... 342/22 |

* cited by examiner

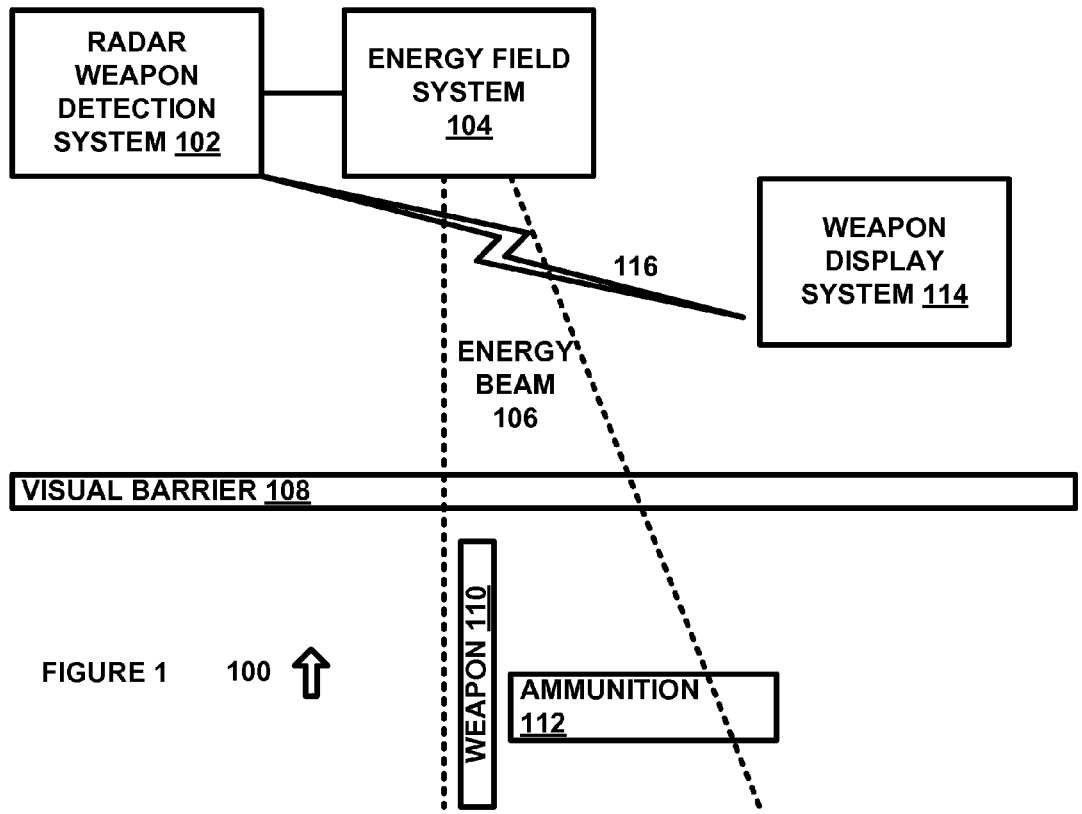
FIGURE 1    100
FIGURE 2    200

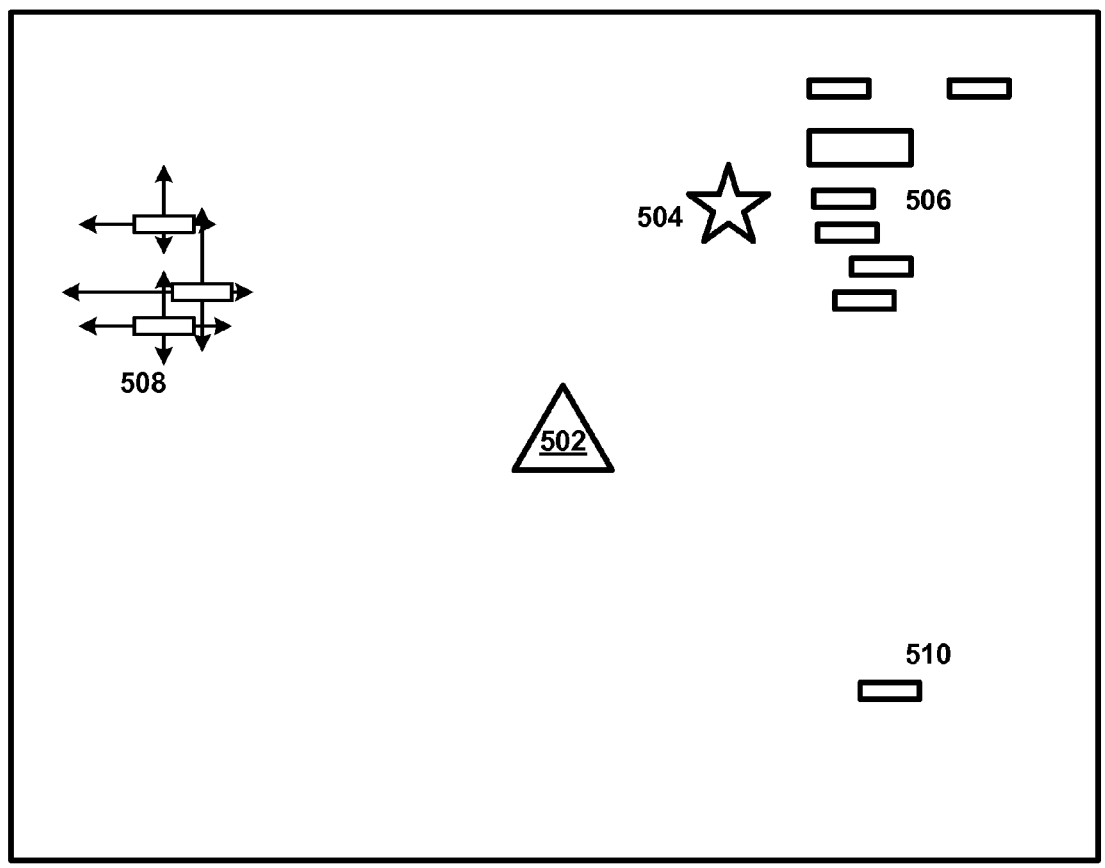

FIGURE 6    600

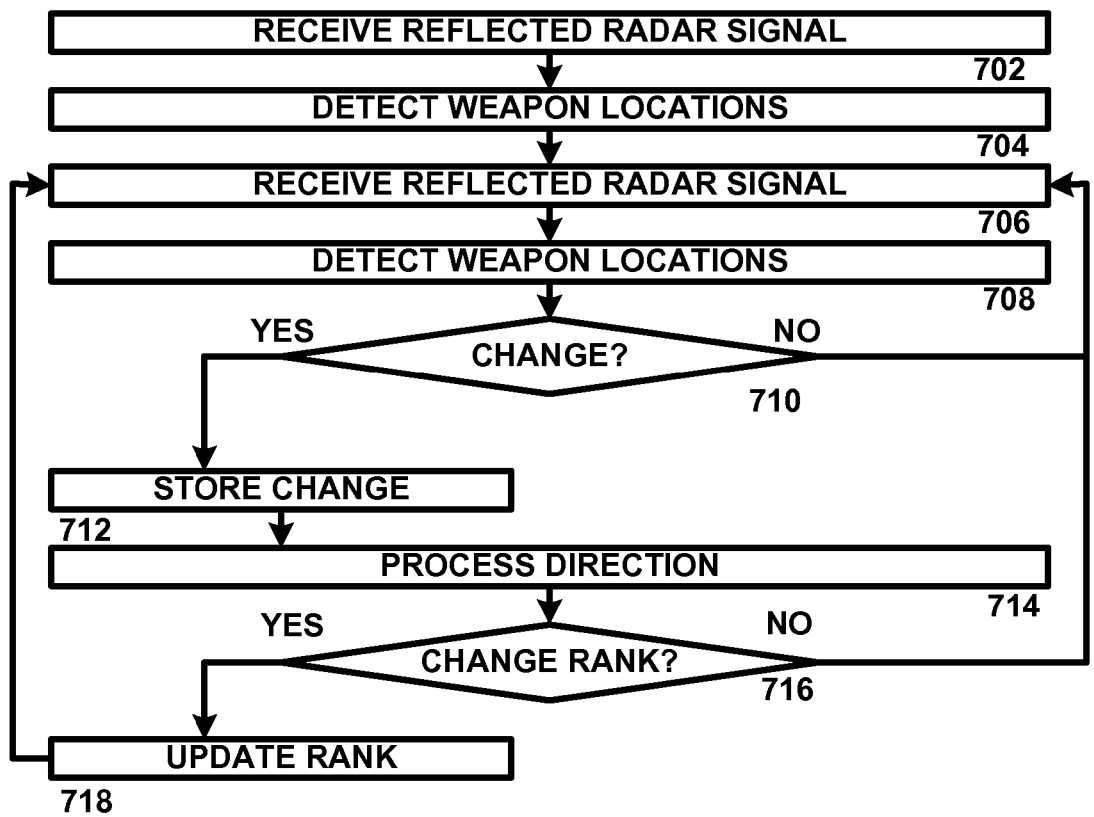

WEAPON DETECTION AND ELIMINATION SYSTEM

FIELD OF THE INVENTION

The present invention pertains to the field of weapons detection systems, and more particularly to a system for the detection of weapons using radar and elimination of detected weapons utilizing an energy field that is tuned to objects having a size and material composition of ammunition for the detected weapons.

BACKGROUND OF THE RELATED ART

Radar detection systems for detecting weapons and energy field systems are know in the art. Radar detection systems can detect the presence and location of weapons, and energy field systems can generate energy fields having predetermined frequency and energy characteristics.

SUMMARY OF THE INVENTION

In accordance with the present invention, a system for detecting and eliminating weapons is provided that utilizes weapons detecting radar systems and energy field systems.

In particular, a system for detecting and eliminating weapons is provided that utilizes weapons detecting radar systems to generate weapons characteristic data that is used to select ammunition types that would be used with the detected weapons, and energy field systems that are programmed with characteristics for heating weapons or detonating ammunition used with the detected weapons so as to disable the weapons and nearby personnel.

In accordance with an exemplary embodiment of the present invention, a system for detecting weapons is provided. The system includes a radar system transmitting electromagnetic radiation, analyzing reflected signals to detect a weapon, and generating reflected signal data. An energy field parameter system receives the reflected signal data and sets a plurality of energy field parameters. An energy field system transmits energy at a location associated with the detected weapon.

The present invention provides many important technical advantages. One important technical advantage of the present invention is a system that allows weapons to be detected and an energy field to be generated and aimed to cause heating of the weapon or detonation of ammunition in the vicinity of the weapon. In this manner, the weapons and personnel in the vicinity of the weapons will be disabled, and the audible and visible artifacts from the detonation of the ammunition will allow personnel to readily locate persons that were using the weapons.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIG. 1 is a diagram of a system for detecting weapons and detonating ammunition in the vicinity of the weapon in accordance with an exemplary embodiment of the present invention;

FIG. 2 is a diagram of a system for a radar weapon detection system 200 in accordance with an exemplary embodiment of the present invention;

DETAILED DESCRIPTION OF THE INVENTION

Figure 3:
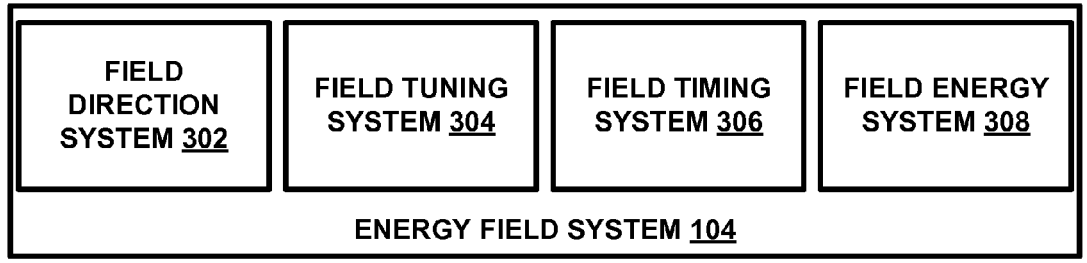
FIG. 3 is a diagram of a system for controlling an energy field in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for detecting weapons and detonating ammunition in the vicinity of the weapon in accordance with an exemplary embodiment of the present invention. System 100 can be used by army personnel, police, or other personnel to detect and neutralize hidden threats.

System 100 includes radar weapon detection system 102, which generates a radar signal and receives reflected indications from metallic objects. Radar weapon detection system 102 includes a radar signal transmitter transmitting a radar signal and an antenna receiving a reflected signal, and processes the reflected signals and determines a size and location of metallic weapons such as guns, rifles, or other metallic weapons. In one exemplary embodiment, radar weapon detection system 102 can be used with only an antenna where energy field system 104 is used to transmit a signal that generates reflected signals that are analyzed to detect a weapon, ammunition, or other suitable items.

Energy field system 104 receives weapon size and location data and generates an energy field 106 that is tuned to resonate weapons or ammunition associated with the detected weapon. In one exemplary embodiment, a detected weapon can be used with predetermined types and sizes of ammunition, which are generally located in the vicinity of the detected weapon. Energy field system 104 directs an energy field 106 towards detected weapons having frequency and energy characteristics to cause the weapon to resonate so as to heat the weapon until it cannot be held or is damaged, or to heat the ammunition to cause it to detonate, thus neutralizing the ammunition and potentially neutralizing personnel in the vicinity of such ammunition. In addition, visual and audio reports of such ammunition detonations can provide personnel with an indication of where the associated weapons and personnel are located. Suitable energy fields such as microwave fields, microwave lasers, or other suitable fields can be used.

Visual barrier 108 obscures the location of weapon 110 and ammunition 112. Because visual barrier 108 prevents weapon 110 and ammunition 112 from visual detection, radar weapon detection system 102 and energy field system 104 can be used to locate and neutralize the threat presented by personnel in the vicinity of weapon 110. Likewise, where such personnel are not present, radar weapon detection system 102 and energy field system 104 can be used to detected caches of hidden weapons and ammunition.

Weapon display system 114 displays weapons detected by radar weapon detection system 102, such as to allow a user to determine the location of potential threats, to subjectively rank threats, or for other suitable purposes. Weapon display system 114 can be integral with radar weapon detection system 102, can be operated remotely using wireless link 116, or can be used in other suitable manners.

In operation, system 100 can be used by military personnel, police or other personnel to detect and neutralize potential threats, weapons caches, or other weapons. In one exemplary embodiment, system 100 can be used by military personnel who are operating in an urban area, such as where insurgents are hiding with weapons such as rocket-propelled grenades, surface to air projectiles, or other weapons. System 100 allows such insurgents or enemy operatives to be detected and neutralized, such as by destroying their weapons or ammunition, causing injury to the insurgents when weapons are heated or ammunition detonates, or by generating a visual and audible report that can be detected and used to track the location of the insurgents and associated weapons.

FIG. 2 is a diagram of a system 200 for a radar weapon detection system 200 in accordance with an exemplary embodiment of the present invention. System 200 includes radar signal detection system 202, weapon location calculation system 204, weapon size calculation system 206, energy field parameter system 208, weapon location display system 210, remote display interface system 212 and weapon tracking system 214 each of which can be implemented in hardware, software, or a suitable combination of hardware and software, and which can be one or more software systems operating on a general purpose processing platform.

Radar signal detection system 202 receives reflected radar signals and detects objects corresponding to the reflected signals. In one exemplary embodiment, the size, dimensions, composition and other parameters of an object can be detected, such as by using the energy and frequency parameters of the transmitted radar energy and the energy and frequency parameters of detected reflections to determine the parameters of an object that generated the reflected energy. For example, when a metallic object is illuminated with a high frequency energy source, it will generate a reflected signal based on the resistivity of the metal, the size and shape of the metal, and other parameters of the metal object. Based on the reflected signal, the location and other parameters of a metallic object can be determined. Likewise, weapons can also be distinguished from non-weapon materials based on the waveform of the reflected signal, which can be used to determine the material properties of the detected object.

Weapon location calculation system 204 calculates a location of a weapon based on reflected radar signals. The direction and distance of a weapon relative to radar weapon detection system 102 can be determined based on the length of time it takes to generate and receive the reflected signal, the frequency and energy characteristics of the reflected signal, the shape of the waveform of the reflected signal relative to the excitation signal, and other parameters.

Weapon size calculation system 206 receives reflected radar signal data and determines weapon size characteristics. In one exemplary embodiment, a smaller weapon will generate a smaller reflected signal than a larger weapon, weapons made out of different materials will generate different waveshapes of reflected signals, and other parameters of the reflected signal can be used to calculate a weapon size based on a reflected radar signal.

Energy field parameter system 208 generates energy field parameters based on detected weapon size and location. In one exemplary embodiment, a weapon size can be used to determine the frequency of energy that will cause a resonant wave to circulate in the weapon, or the frequency of energy required to heat associated ammunition for the weapon, such as where the weapon has a copper shell, a fragmenting metallic casing, or other characteristics. For detected weapons that are farther away, a narrower field dimension can be generated whereas for closer weapons, a wider field can be generated. The length of time required to illuminate a weapon and associated ammunition can also be varied as a function of field size and the distance between the energy field and the weapon. Likewise, energy field parameter system 208 can adjust energy field parameters such as frequency, based on a search algorithm that maximizes the energy field at a resonant frequency of a weapon, ammunition, or other suitable targets. In one exemplary embodiment, energy field frequency can be adjusted and the reflected energy can be monitored to detect an increase in reflected energy that is indicative of an increasing level of excitation, such as where the weapon, ammunition or other target is approaching resonance. In this exemplary embodiment, a search algorithm such as the following can be used:

$$F(N+1)=F(N)+/-X*(F(N))$$

where F(N) is a current frequency characteristic of the energy field, X is a variable based on a search parameter, and F(N+1) is the new energy beam frequency characteristic. In this exemplary embodiment, the initial frequency of the energy field can be selected from a table of resonant frequency targets associated with a weapon or ammunition that is used by the weapon, and the amount of variation in the energy field frequency can be selected based on responses to changes in measured reflected signals. For example, if a weapon is detected and is illuminated with an energy field at an expected resonant frequency of the weapon, the frequency of the energy field can be increased by a suitable amount, such as 0.1%, and the effect of that increase on the measured reflected signal can be used to determine whether to further increase or decrease the energy field frequency. In this exemplary embodiment, where the measured reflected signal decreases with an increase in energy field frequency, the frequency of the energy field can be decreased to determine whether the reflected signal increases. Increases or decreases can then be continued until a maximum is reached. The step size of the energy field frequency increase or decrease can also be increased or reduced, such as where an increase and a decrease both result in a reduction in the measured reflected signal, which indicates that the step size may be too large, or where the amount of increase in the reflected signal accelerates, which indicates that a larger step size can be used to accelerate identification of the resonant frequency. When a maximum in the reflected signal is reached, the frequency of the energy field can be maintained at that value, so as to result in increased energy transfer to the target.

Weapon location display system 210 generates a display showing the size and location of detected weapons. In one exemplary embodiment, weapon location display system 210 can generate a map showing the location of a user relative to detected weapons, so as to allow a user to determine the location of detected weapons, such as in an urban setting where buildings or other structures obscure a direct line of sight to the weapons. Weapon location display system 210 can generate different icons representing the relative size of detected weapons, can identify the type of weapon where positive identification is obtained, can generate a user-controllable icon that allows a user to indicate the targets that should be illuminated by the energy field, can identify targets that are being illuminated to avoid inadvertent interference, or can display other suitable information. Weapon location display system 210 can also generate icons indicating previous locations of weapons or detected targets, so as to allow an operator to determine whether the targets have remained stationary, which may indicate targets that are in storage or that do not have enemy personnel nearby.

Remote display interface system 212 allows a remote display to receive information on the location, size and other parameters for detected weapons. Remote display interface system 212 allows a user to transmit commands to radar weapon detection system, such as to manually direct placement of an energy field, to initiate automatic scanning of a location with the energy field, to provide weapon or ammunition identification data if visual observation of the weapon or ammunition is obtained, or to provide other suitable commands or data.

Weapon tracking system 214 receives weapon location data and tracks movement to reduce false detections, weapons depots, stored weapons, or other reduced importance targets. In one exemplary embodiment, a plurality of potential weapons may be detected, which can include weapon-sized objects that are not weapons. By tracking potential targets that are in motion, the reliability of detection can be improved, as a weapon that is being used is more likely to be in motion than structural components, piping, or other items that may generate a false indication. In another exemplary embodiment, a score can be assigned to different types of motions, such as repetitive motions that indicate a weapon that is being carried by a patrolling enemy, random motions of a large number of potential targets that indicate a concentration of enemy personnel with weapons, progressive motion indicating movement of an enemy towards a user, or other types of motion.

In operation, system 200 allows a radar system to receive and process reflected signals to determine a size and location of detected weapons, to select parameters for ammunition that is used with the detected weapons, and to control an energy field to illuminate the weapons and ammunition with energy so as to cause the metallic components of the weapons and ammunition to be excited at a resonant frequency, causing heating and subsequent damage to the weapon, injury to personnel holding the weapon, or detonation of the ammunition.

FIG. 3 is a diagram of a system 300 for controlling an energy field in accordance with an exemplary embodiment of the present invention. System 300 includes field direction system 302, field tuning system 304, field timing system 306 and field energy system 308, each of which can be implemented in hardware, software, or a suitable combination of hardware and software, and which can be one or more software systems operating on a general purpose processing platform.

Field direction system 302 receives location data for a weapon and directs an energy field based on the location data. In one exemplary embodiment, field direction system 302 can direct a wide field in single location, can direct a narrower field in a series of locations, or can use other suitable processed for directing an energy field so as to transmit sufficient energy to weapons or ammunition to cause the weapon to heat or the ammunition to detonate. Field direction system 302 can also be used to increase or decrease the field size, move the field within the vicinity of the detected location of the weapon to locate ammunition that is not within a field width of the weapon, change field shape parameters, or otherwise control the direction, size and shape of an energy field. Field direction system 302 can also allow a user to manually control placement of the energy field, to assign a priority to targets, or to provide other suitable commands.

Field tuning system 304 controls a frequency of an energy field. In one exemplary embodiment, the frequency of an energy field can be set to resonate a weapon based on the detected size of the weapon, ammunition based on an expected size of a shell, casing or other metallic components of the ammunition, or other suitable structures. Field tuning system 304 can also receive feedback from radar weapon detection system 102, such as where the frequency of the energy field is adjusted and the reflected signals are monitored to determine whether the weapon or ammunition is being excited at a resonant frequency.

For example, the resonant frequency along the length of a shell having a length of 10 millimeters is 300000000/0.01 or 30 GHz, the resonant frequency of a grenade having a length of 20 centimeters on a rocket propelled grenade is 300000000/0.2 or 1.5 GHz, and the resonant frequency of a rifle barrel having a length of one meter is 300000000/1 or 300 MHz. Additional resonant modes also exist in other dimensions, and the optimal resonant mode can be determined by varying the frequency of the energy field and measuring the reflected signal until it reaches a maximum. In this manner, the initial frequency for the energy field can be based on known ammunition dimensions that correlate to the size of the detected weapon, which will typically be easier to detect from the radar data than the ammunition, and the frequency of the energy field can be varied to maximize the energy transferred to the ammunition in the vicinity of the weapon. Likewise, where obstructions absorb transmitted energy at certain frequency ranges, the frequency of the energy field can be adjusted so as to avoid such frequency ranges to increase the amount of energy delivered to weapons, ammunition, or other suitable structures.

Field timing system 306 generates energy field timing characteristics. In one exemplary embodiment, an energy field may be able to run for a predetermined period of time based on system parameters, available energy, or other suitable parameters, such that the length of time that the energy field will be allowed to operate is controlled so as not to deplete the energy source or damage the field generation system. Likewise, where detected weapons or ammunition have been illuminated for a sufficient length of time to cause heating, damage or detonation, field timing system 306 can terminate operation of the energy field so as to conserve energy. For example, an energy field transmitting 100 kilowatts of energy in a 100 square centimeter area circle at the expected location of a weapon and ammunition will deliver up to 1000 watts per square centimeter of energy to the weapon or ammunition at that location. The expected time for the weapon or ammunition to experience a rise in temperature sufficient to render the weapon inoperable, to damage the weapon, to cause injury to personnel holding the weapon, to ignite the primer or charge, or to otherwise render the weapon or ammunition inoperative can be determined analytically or experimentally, and the length of time that the field is allowed to illuminate a location can be set based on a multiple of the expected time to cause detonation.

Field energy system 308 controls an amount of energy that is transmitted by an energy field. In one exemplary embodiment, where the energy field is illuminating near field targets, the amount of energy can be decreased, whereas when far field components are being illuminated, the amount of energy can be increased. Likewise, the amount of energy can be based on the size of the field at the point of illumination, the size of the field can be maximized based on available energy, or other suitable processes can also or alternatively be used.

In operation, system 300 is used to control energy field parameters so as to generate an energy field that causes illuminated weapons or ammunition to resonate and generate heat so as to cause the weapon to be rendered inoperable or to cause the ammunition to detonate.

Figure 4:
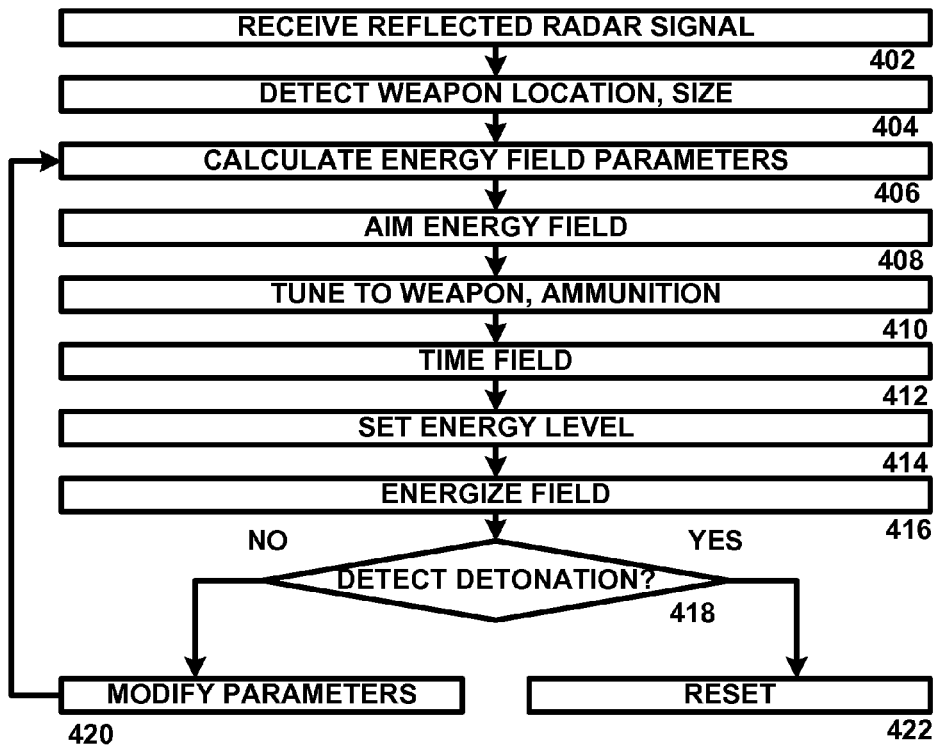
FIG. 4 is a diagram of method for detecting and detonating weapons and ammunition in accordance with an exemplary embodiment of the present invention.

FIG. 4 is a diagram of method 400 for detecting and heating weapons and ammunition in accordance with an exemplary embodiment of the present invention. Method 400 begins at 402, where a reflected radar signal is received. The reflected radar signal is then analyzed at 404 to determine a weapon location, size, or other suitable parameters. In one exemplary embodiment, the strength of the reflected signal, the wave form of the reflected signal, the time between the transmission of the radar signal and the reception of the reflected signal or other suitable parameters can be measured and analyzed to determine a weapon size, location, and to differentiate between objects made of weapons material and non-weapon objects. Likewise, relative motion of potential targets can be used to distinguish between actual targets and objects that resemble targets, between active targets and inactive targets, or to otherwise improve the reliability of detection. The method then proceeds to 406.

At 406, energy field parameters are calculated. In one exemplary embodiment, the resonant frequency for a weapon can be calculated, or type of ammunition used with the weapon can be determined from a look-up table storing associated ammunition types, and the frequency of the energy field can be selected based on the resonant frequency. Likewise, the area of the energy field at the location of the weapon can be selected to ensure that the amount of energy provided to the weapon or ammunition is sufficient to cause the weapon to be damaged or the ammunition to ignite. The method then proceeds to 408.

At 408, the energy field is aimed at the expected location of the weapon or ammunition, such as by selecting phased array parameters, by mechanical alignment, or in other suitable manners. The method then proceeds to 410.

At 410, the energy field is tuned to maximize energy transfer to the weapon, the ammunition, or other suitable objects. In one exemplary embodiment, the frequency of the energy field can be increased or decreased and the reflected signal can be measured to determine whether the amount of energy being received and radiated by illuminated objects is increasing or decreasing. When it is determined that the energy has been maximized, or when it is otherwise determined that frequency of the energy field has been optimized, the method proceeds to 412.

At 412, a length of time for illumination is determined. For example, where it is determined that the weapon or ammunition that is at the location of the field should reach a temperature at which damage or detonation should occur within a time period X, the field can be focused on the area under illumination for a predetermined period of time, such as 2X, 3X, or other suitable times. The method then proceeds to 414.

At 414, the energy level of the energy field is set. In one exemplary embodiment, where the maximum available energy is not being provided, the energy level can be increased to the maximum available energy. Likewise, the energy level can be set based on available energy reserves, mission time, or other suitable parameters. The method then proceeds to 416.

At 416, the field is energized, if the field has not already been energized. The method then proceeds to 418.

At 418, it is determined whether detonation has been detected, such as by a decrease in the reflected energy from the weapon or ammunition, from visual or audio reports, or in other suitable manners. If detonation has not been detected, the method proceeds to 420, where field parameters are modified, such as by changing the location of the field, the frequency, the energy, or other suitable parameters. The method then returns to 406. Likewise, if it is determined that detonation has been detected, the proceeds to 422 where the system is reset to locate other weapons.

In operation, method 400 allows hidden weapons to be detected and illuminated with an energy field so as to damage the weapon, detonate ammunition in the location of the weapon, or to otherwise render the weapon inoperative. Method 400 adjusts the frequency of the energy field to match a resonant frequency of the weapon or ammunition so as to maximize the amount of energy that is transferred to the weapon or ammunition, to reduce the amount of time required to damage the weapon or detonate ammunition. Certain of the exemplary steps of method 400 can omitted where suitable, such as energizing the field after tuning instead of during tuning, setting a time for the field, using a maximum energy instead of setting the energy level, or other suitable steps can be omitted. Likewise, the energy field can be used in a search mode, where radar location of a weapon is used to locate an initial search location and where the energy field is scanned within a predetermined pattern.

Figure 5:
FIG. 5 is a diagram of a map identifying the location of weapons relative to the location of friendly forces in accordance with an exemplary embodiment of the present invention.

FIG. 5 is a diagram of a map 500 identifying the location of weapons relative to the location of friendly forces in accordance with an exemplary embodiment of the present invention. Map 500 includes location icon 502, which indicates the location of friendly troops, the user of a remote weapon display system 114, or other suitable non-hostile parties. Selection icon 504 allows a user to see where an energy field is currently focused, and can also allow a user to move selection icon 504 so as to place selection icon 504 on a target of interest, such as a target where the user is attempting to gain access, a target with the greatest concentration of weapons, or other suitable targets. Threat icons 506, 508 and 510 present a graphic display of the size and number of detected weapons. As shown in exemplary map 500, the largest number of detected weapons is associated with threat icon 506, which also shows one weapon that is larger than other weapons associated with threat icon 506. Based on the information provided to a user, a decision can be made to illuminate the area of threat icon 506 first, and the size and type of weapons can be used to select energy field parameters. Likewise, a user can provide weapon and ammunition type data if visual surveillance of the threat is obtained and the weapons and ammunition are identified, so as to improve the efficacy of the field energy in causing detonation of ammunition.

Threat icon 508 includes arrow indicators that can be used to determine the change in position of the detected target objects. In this exemplary embodiment, the lack of associated position change indicators for threat icons 506 and 510 can be used to indicate that the targets associated with threat icon 508 have associated enemy personnel carrying the detected target objects, whereas the stationary positions of threat icons 506 and 510 indicate that the associated target objects are inactive, in storage, or otherwise do not have associated enemy personnel nearby. In this manner, an operator does not need to watch map 500 to determine whether detected target objects have been remaining stationary, so as to allow the operator to select target objects with associated personnel and to avoid target objects that are not a present threat.

Figure 6:
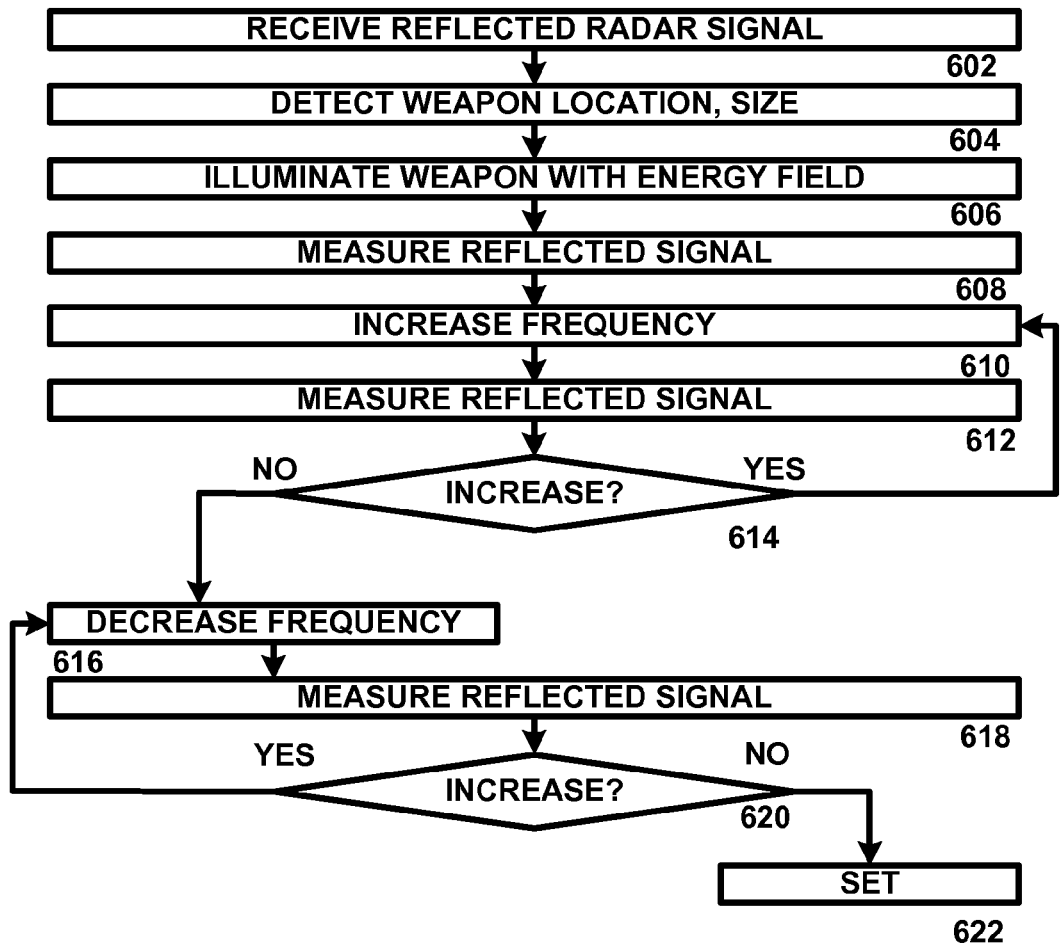
FIG. 6 is a flow chart of a method for tuning an energy field to a resonant frequency of a target in accordance with an exemplary embodiment of the present invention.

FIG. 6 is a flow chart of a method 600 for tuning an energy field to a resonant frequency of a target in accordance with an exemplary embodiment of the present invention. Method 600 begins at 602, where a reflected radar signal is received. The method then proceeds to 604, where the radar signal is processed to detect a weapon location and size. In one exemplary embodiment, the reflected signal can be processed in a digital domain, and frequency components of the reflected signal can be used to determine characteristics of the objects creating the reflected signal. Objects have size, material or other characteristics that exclude them from being potential weapons can be excluded, reflections can be eliminated or used to confirm object sizes and locations, or other suitable processes can be used. The method then proceeds to 606.

At 606, one or more detected weapons are illuminated with an energy field, such as by determining an expected resonant frequency of the detected weapons. The method then proceeds to 608, where a reflected signal from the illuminated objects is received. In one exemplary embodiment, and frequency components of the reflected signal can be used to confirm the identity of the objects creating the reflected signal. The method then proceeds to 610.

At 610, the frequency of the energy field is increased, such as by a predetermined amount, an amount calculated based on prior increases, or in other suitable manners. The method then proceeds to 612 where the reflected signal is measured. Because the frequency of the energy field has changed, the reflected signal may require additional analysis to exclude objects or to re-acquire the location or orientation of the weapon. The method then proceeds to 614 where it is determined whether the reflected signal has increased. In one exemplary embodiment, where an energy field is close to a resonant frequency of an object that is being illuminated by the energy field, a reflected signal from the object may increase in energy at a detected frequency or at other frequencies as the frequency of the energy field approaches a resonant frequency of the object. If it is determined that the reflected signal has increased, the method returns to 610, otherwise the method proceeds to 616.

At 616, the frequency of the energy field is decreased, such as by a predetermined amount, an amount based on previous changes to the frequency of the energy field, or other suitable amounts. The method then proceeds to 618 where the reflected signal is measured, such as by detecting frequency components and an associated magnitude of frequency components, by processing the signal to exclude non-weapon objects or to re-acquire the detected object, or in other suitable manners. The method then proceeds to 620.

At 620, it is determined whether the reflected signal has increased. In one exemplary embodiment, where an energy field is close to a resonant frequency of an object that is being illuminated by the energy field, a reflected signal from the object may increase in energy at a detected frequency or at other frequencies as the frequency of the energy field approaches a resonant frequency of the object. If it is determined that the reflected signal has increased, the method returns to 616, otherwise the method proceeds to 622.

At 622, the frequency of the energy field is set to the frequency that provided the greatest reflected signal, such as where the frequency indicates that the energy field is exciting a resonant mode of a detected weapon.

In operation, method 600 allows an energy field to be tuned to a resonant frequency of a detected weapon, such as to maximize energy transfer to the weapon so as to cause damage to the weapon, ignition of ammunition, or other suitable effects.

Figure 7:
FIG. 7 is a flow chart of a method for tracking a location of a weapon in accordance with an exemplary embodiment of the present invention.

FIG. 7 is a flow chart of a method 700 for tracking a location of a weapon in accordance with an exemplary embodiment of the present invention. Method 700 begins at 702, where a reflected radar signal is received. In one exemplary embodiment, the reflected radar signal can be transformed from a time to a frequency domain and frequency components of the reflected signal can be determined, such as by performing a fast fourier transform of the signal or in other suitable manners. The method then proceeds to 704.

At 704, weapon locations and orientations are determined from the radar signal and stored, such as by excluding objects that have dimensions that do not match weapon dimensions, by using reflected signals to confirm the location, size, orientation or other characteristics of objects reflecting the radar signal, or in other suitable manners. The method then proceeds to 706.

At 706, a reflected radar signal is received. In one exemplary embodiment, the reflected radar signal can be transformed from a time to a frequency domain and frequency components of the reflected signal can be determined, such as by performing a fast fourier transform of the signal or in other suitable manners. The method then proceeds to 708.

At 708, weapon locations and orientations are determined from the radar signal and stored, such as by excluding objects that have dimensions that do not match weapon dimensions, by using reflected signals to confirm the location, size, orientation or other characteristics of objects reflecting the radar signal, or in other suitable manners. The method then proceeds to 710.

At 710, it is determined whether a change has occurred in the weapon location or orientation. In one exemplary embodiment, stored weapon location, orientation or other suitable data can be compared to determine whether a change has occurred. If it is determined that no change has occurred, the method returns to 706. Otherwise, the method proceeds to 712 where the change is stored, such as on a map to allow the change in location to be tracked and analyzed. The method then proceeds to 714.

At 714, the direction of a change is processed. In one exemplary embodiment, directions can be given priority, such as when a first mode of operation is used to give priority to targets that are approaching a location, a second mode of operation is used to give priority to targets that are receding from a location, a third more of operation is used to give priority to targets that are moving in a pattern that represents deployment of forces, or in other suitable manners. The method then proceeds to 716.

At 716, it is determined whether to change a rank associated with a target. In one exemplary embodiment, targets can be ranked based on a threat rating, such as where the rank is used to generate a display, to target an energy field, or in other suitable manners. If it is determined that the rank of a target is to be changed, the method proceeds to 718 where a change in a target rank is generated. The method then returns to 706. Otherwise, if no change of rank is determined at 716, the method returns to 706.

In operation, method 700 allows target locations to be tracked and ranked, so as to identify active targets from passive targets, to assist with threat assessment, to assist with target selection for an energy field, or for other suitable purposes.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for detecting weapons comprising:
a radar system transmitting low power electromagnetic radiation, analyzing reflected signals to detect a weapon that includes a conducting metallic structure, and generating reflected signal data;
an energy field parameter system receiving the reflected signal data and setting a plurality of energy field parameters that are selected in order to excite the conducting metallic structure of the weapon at a resonant frequency;
an energy field system generating high power energy based on the energy field parameters and transmitting the energy at a location associated with the detected weapon; and
a field tuning system receiving the plurality of energy field parameters and controlling a frequency of the transmitted energy based on the energy field parameters, the energy field parameters including an indicator that a reflected frequency component has increased, indicating resonance.

2. The system of claim 1 further comprising a weapon location calculation system receiving the reflected signal data and determining a distance to the weapon.

3. The system of claim 1 further comprising a weapon size calculation system receiving the reflected signal data and determining a size of the weapon.

4. The system of claim 1 further comprising a field direction system receiving the plurality of energy field parameters and controlling the location of the transmitted energy.

5. The system of claim 1 further comprising a field timing system receiving the plurality of energy field parameters and controlling a transmission time of the transmitted energy.

6. The system of claim 1 further comprising a field energy system receiving the plurality of energy field parameters and controlling an energy setting of the transmitted energy.

7. A method for detecting weapons comprising:
transmitting low power electromagnetic radiation in a search field;
analyzing reflected signals to detect a weapon;
generating reflected signal data;
generating a plurality of energy field parameters based on the reflected signal data to excite a resonant mode of the detected weapon; and
transmitting a high power energy field having the energy field parameters at a location associated with the weapon to transfer energy to the weapon using resonant energy transfer so as to avoid blocking of the energy by intervening objects.

8. The method of claim 7 further comprising receiving the reflected signal data and determining a distance to the weapon.

9. The method of claim 7 further comprising receiving the reflected signal data and determining a size of the weapon.

10. The method of claim 7 further comprising controlling the location of the energy field based on the plurality of energy field parameters.

11. The method of claim 7 further comprising controlling a frequency of the transmitted energy based on the plurality of energy field parameters so as to excite a resonant mode of oscillation of the weapon.

12. The method of claim 7 further comprising selecting a frequency of the transmitted energy based on an ammunition size associated with the weapon.

13. The method of claim 7 further comprising:
generating a display showing the location of two or more weapons; and
receiving a command to direct the transmitted energy to one of the two or more weapons.

14. A system for detecting weapons comprising:
an energy field system transmitting energy at a location associated with a weapon;
an antenna system receiving a reflected signal from the weapon and generating reflected signal data; and
an energy field parameter system receiving the reflected signal data and setting a plurality of energy field parameters to generate an energy field that will excite a resonant mode of the weapon.

15. The system of claim 14 further comprising a weapon location calculation system receiving the reflected signal data and determining a distance to the weapon.

16. The system of claim 14 further comprising a weapon size calculation system receiving the reflected signal data and determining a size of the weapon.

17. The system of claim 14 further comprising a weapon display system displaying a map showing the location of detected weapons.

18. The system of claim 14 further comprising a field tuning system receiving the plurality of energy field parameters and controlling a frequency of the transmitted energy.

19. The system of claim 14 further comprising a field tuning system receiving weapon data and controlling a frequency of the transmitted energy based on ammunition data associated with the weapon data.

20. The system of claim 14 wherein the energy field system transmits low power energy at the location associated with the weapon, and the energy field parameter system sets the plurality of energy field parameters to generate a high-power energy field.

* * * * *